US010901746B2

(12) United States Patent
Huang et al.

(10) Patent No.: US 10,901,746 B2
(45) Date of Patent: Jan. 26, 2021

(54) AUTOMATIC ANOMALY DETECTION IN COMPUTER PROCESSING PIPELINES

(71) Applicant: Microsoft Technology Licensing, LLC, Redmond, WA (US)

(72) Inventors: Zicheng Huang, Bothell, WA (US); Jianshu Ji, Seattle, WA (US); Hao Peng, Kirkland, WA (US); Ling Li, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/228,663

(22) Filed: Dec. 20, 2018

(65) Prior Publication Data

US 2020/0201650 A1 Jun. 25, 2020

(51) Int. Cl.

| | |
|---|---|
| ***G06F 11/00*** | (2006.01) |
| ***G06F 9/38*** | (2018.01) |
| ***G06F 11/07*** | (2006.01) |
| ***G06F 11/30*** | (2006.01) |
| ***G06F 11/36*** | (2006.01) |

(52) U.S. Cl.

CPC .......... *G06F 9/3861* (2013.01); *G06F 11/079* (2013.01); *G06F 11/0721* (2013.01); *G06F 11/30* (2013.01); *G06F 11/3006* (2013.01); *G06F 11/3051* (2013.01); *G06F 11/3688* (2013.01)

(58) Field of Classification Search

CPC .... G06F 11/079; G06F 11/30; G06F 11/3006; G06F 11/3065

See application file for complete search history.

(56) References Cited

U.S. PATENT DOCUMENTS

| | | | | |
|---|---|---|---|---|
| 2014/0229414 | A1 | 8/2014 | Goldberg et al. | |
| 2014/0372309 | A1 | 12/2014 | Shirey et al. | |
| 2017/0118099 | A1 * | 4/2017 | Huang | G06F 11/30 |
| 2019/0132191 | A1 * | 5/2019 | Mann | G06Q 10/20 |

OTHER PUBLICATIONS

"International Search Report and Written Opinion Issued in PCT Application No. PCT/US19/064568", dated Feb. 28, 2020, 13 Pages.

* cited by examiner

*Primary Examiner* — Charles Ehne

(74) *Attorney, Agent, or Firm* — Alleman Hall Creasman & Tuttle LLP

(57) ABSTRACT

A computer processing pipeline is automatically computer monitored. The computer processing pipeline includes a plurality of ordered computer stages. At least one computer stage is configured to receive an input data set and perform one or more computer processing operations on the input data set to produce an output data set. The output data set is provided as input to another computer stage of the computer processing pipeline. A historical expected schedule is automatically computer generated for compliant execution of the at least one computer stage. The output data set is automatically computer sampled at a designated time dictated by the historical expected schedule. The sampled output data set is automatically computer tested for compliance with one or more detection rules. An anomaly alert that identifies one or more anomalies is automatically computer issued based on non-compliance of the output data set with the one or more detection rules.

19 Claims, 5 Drawing Sheets

HISTORICAL EXPECTED SCHEDULE 122

| 07/01 1:00 | 07/01 2:00 | 07/01 3:00 | ... | 07/02 3:00 | 07/02 4:00 |
|---|---|---|---|---|---|
| PROCESS A INPUT SET: A OUTPUT SET: B RUNTIME: 0.9 HR START TIME: 07/01, 1:00 | PROCESS B INPUT SET: B OUTPUT SET: C RUNTIME: 0.9 HR START TIME: 07/01, 2:00 | PROCESS C INPUT SET: C OUTPUT SET: D RUNTIME: 0.9 HR START TIME: 07/01, 3:00 | | PROCESS F INPUT SET: G OUTPUT SET: H RUNTIME: 0.9 HR START TIME: 07/02, 3:00 | PROCESS H INPUT SET: H OUTPUT SET: I RUNTIME: 0.9 HR START TIME: 07/02, 4:00 |
| | | PROCESS D INPUT SET: E OUTPUT SET: F RUNTIME: 23 HR START TIME: 07/01, 3:00 | | PROCESS G INPUT SET: F OUTPUT SET: G RUNTIME: 23 HR START TIME: 07/03, 3:00 | |

AUTOMATIC ANOMALY DETECTION IN COMPUTER PROCESSING PIPELINES

BACKGROUND

Computer processing pipelines may be executed on a distributed computer system to support large-scale computer processing, such as for data aggregation performed by a search engine. The distributed computer system may comprise a plurality of network-connected computers that pool computer resources to execute the computer processing pipelines. In some cases, the distributed computer system may have stability issues that cause data errors or anomalies in the computer processing pipelines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computer processing pipeline is automatically computer monitored. The computer processing pipeline includes a plurality of ordered computer stages. At least one computer stage is configured to receive an input data set and perform one or more computer processing operations on the input data set to produce an output data set. The output data set is provided as input to another computer stage of the computer processing pipeline. A historical expected schedule is automatically computer generated for compliant execution of the at least one computer stage. The output data set is automatically computer sampled at a designated time dictated by the historical expected schedule. The sampled output data set is automatically computer tested for compliance with one or more detection rules. An anomaly alert that identifies one or more anomalies is automatically computer issued based on non-compliance of the output data set with the one or more detection rules.

BRIEF DESCRIPTION OF THE DRAWINGS

FIG. 2 schematically shows aspects of a historical expected schedule for a computer processing pipeline.

DETAILED DESCRIPTION

Figure 1:
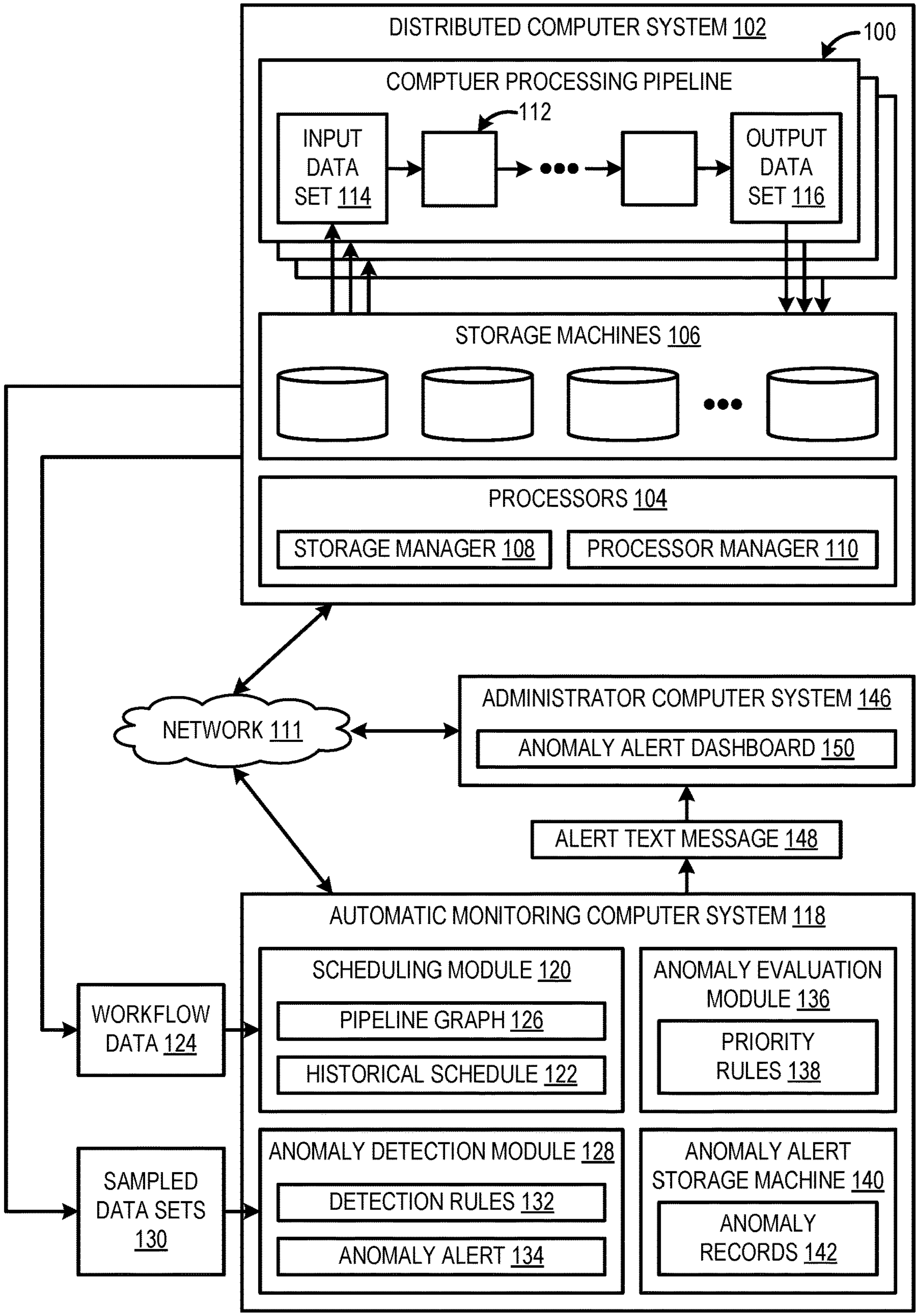
FIG. 1 schematically shows an example automatic monitoring computer system configured to automatically detect computer anomalies in one or more computer processing pipelines.

Computer processing pipelines executed on a distributed computer system may produce data errors or computer anomalies for various reasons. As one example, one or more computers of the distributed computer system may incur a logical fault that causes a computer processing pipeline to output corrupted data. As another example, network connection instability between computers of the distributed computer system may cause data to be dropped or otherwise unavailable. As yet another example, hardware failure of one or more computers of the distributed computer system may prevent a processing operation from being performed.

In some examples, a computer processing pipeline may be manually monitored by a human administrator. In such a manual monitoring approach, the human administrator may only know the final status of the computer processing pipeline after processing operations have been completed for the entire computer processing pipeline. In particular, the human administrator may only know that the computer processing pipeline either succeeded or failed after the final stage of the pipeline. In such a manual approach, errors or computer anomalies may not be identified until after the computer processing pipeline has either successfully or unsuccessfully completed the final stage. Additionally, such a manual monitoring approach provides no insight regarding where in the computer processing pipeline an error or computer anomaly occurs. Moreover, such a manual monitoring approach is unable to anticipate additional downstream errors or computer anomalies due to dependencies between different computer stages of the computer processing pipeline.

Accordingly, a framework for automatically monitoring and detecting anomalies in a computer processing pipelines is provided. Such a framework may be scalable to automatically computer monitor and detect computer anomalies for a plurality of computer stages of a computer processing pipeline, and further to automatically computer monitor and detect computer anomalies for virtually any number of different computer processing pipelines.

By employing a historical expected schedule for automatic computer monitoring and anomaly detection, anomalies in operation of a computer processing pipeline can be automatically detected without having to wait until a final stage of the computer processing pipeline has completed processing operations. In this way, anomaly alerts may be issued in a substantially real-time manner if intermediate stages of the pipeline fail. Moreover, by issuing anomaly alerts in substantially real-time, in some cases, additional computer anomalies that are based on dependencies of a downstream computer stage may be anticipated and dealt with in a timelier manner. Because computer anomalies can be identified for specific computer stages of the computer processing pipeline according to the expected historical schedule, root cause diagnostics at an individual computer stage level may be used to resolve the computer anomaly before downstream consequences are compounded.

FIG. 1 shows an example computer framework for automatically computer monitoring and detecting anomalies in operation of computer processing pipelines. In the depicted example, a plurality of computer processing pipelines 100 each may be executed on a distributed computing system 102. The distributed computing system 102 may include a plurality of distributed processors 104 and a plurality of distributed storage machines 106. The plurality of distributed processors 104 and the plurality of distributed storage machines 106 may take the form of a plurality of network-connected computers (e.g., server computers) configured to send and/or receive messages, data, and/or other information to and/or from each other via a network 111, such as the Internet.

The distributed computer system 102 may pool and centrally manage the distributed computer resources (e.g., processors 104, storage machines 106) to execute one or more of the computer processing pipelines 100. In one example, the distributed computer system 100 may include a data storage manager 108 and a processor manager 110. The data storage manager 108 may be configured to divide data sets into different blocks and distribute the blocks across different nodes of the plurality of distributed storage machines 106. In one example, the data storage manager 108 comprises a distributed file system, such as Apache Hadoop. The distributed computing system 102 may employ any suitable distributed file system. The processor manager 110 may be configured to schedule processing operations of the computer processing pipeline(s) across the plurality of distributed processors 104 for parallel processing. The processor manager 110 may be configured to schedule the processing operations based on workflows programmed for one or more of the plurality of computer processing pipelines 100. A workflow may include a sequence of processing steps performed by one or more computer stages of one or more computer processing pipelines. In some examples, a workflow may specify a trigger or start time for initiating one or more processing operations. For example, a workflow may specify that a processing operation may be performed, or a data set may be produced at a particular time or at a regular interval (e.g., a particular output data set may be produced every hour, day, month, or year). In one example, the processor manager 110 comprises a MapReduce programming model. The distributed computing system 102 may employ any suitable processing model for managing operation of the plurality of distributed processors 104.

Each of the plurality of computer processing pipelines 100 includes a plurality of ordered computer stages 112. Each computer stage 112 is configured to receive an input data set 114 from one or more storage machines 106 of the distributed computer system 102. The computer stage 112 is configured to perform one or more computer processing operations on the input data set 114 to produce an output data set 116. The output data set 116 may be stored on one or more storage machines 106 of the distributed computing system 102. Although the input data set 114 is depicted as being input to only the first computer stage of the computer processing pipeline 100, it will be appreciated that downstream computer stage(s) of the computer processing pipeline 100 may receive intermediate data set(s) output from other stages. Likewise, although the output data set 116 is depicted as only being output from the final computer stage of the computer processing pipeline 100, it will be appreciated that upstream computer stage(s) of the computer processing pipeline 100 may produce intermediate output data set(s) used as input at other stages.

In some cases, a computer stage may receive an input data set that was output from another computer stage and/or provide an output data set as input to a different computer stage of the computer processing pipeline 100. Such an arrangement may create dependencies between different computer stages of the computer processing pipeline 100. Furthermore, in some cases, a computer processing pipeline may receive an input data set that was output from another computer processing pipeline and/or provide an output data set as input to a different computer processing pipeline. Such an arrangement may create dependencies between different computer processing pipelines.

The distributed computing system 102 may take any suitable form and may be configured to execute any suitable number of computer processing pipelines in series and/or parallel. In some examples, the distributed computing system 102 may comprise a large-scale network of many network-connected computers configured to execute a significant number of computer processing pipelines configured to solve problems involving massive amounts of data and computations. Such large-scale parallel processing may be employed for various applications including enterprise business, search engines, social networks, digital media, and other large-scale data processing applications.

Execution of the plurality of computer processing pipelines 100 on the distributed computer system 102, in some cases, may produce data errors or computer anomalies for various reasons including logical faults, network connection instability, and hardware failure, among other reasons. Due to multitudinous data sets and complicated data processing logic of large-scale parallel computer processing pipelines executed across the distributed computer system 102, manual monitoring and anomaly detection by a human administrator may be infeasible. Accordingly, an automatic monitoring computer system 118 may be configured to automatically monitor operation of the plurality of computer processing pipelines 100 and issue anomaly alerts based on detecting errors or computer anomalies in operation of the plurality of computer processing pipelines 100. The automatic monitoring computer system 118 may be in communication with the distributed computing system 102 via the network 111.

The automatic monitoring computer system 118 may comprise a scheduling module 120. The scheduling module 120 may be configured to generate a historical expected schedule 122 of operation of the plurality of processing pipelines 100. The historical expected schedule 122 may indicate an expected time when each computer stage 112 of each computer processing pipeline is expected to produce an output data set. The scheduling module 120 may be configured to generate the historical expected schedule 122 in a preprocessing phase that is performed separate from automatic computer monitoring, which is performed at runtime of the plurality of computer processing pipelines.

For the process of generating the historical expected schedule 122, the scheduling module 120 may be configured to receive workflow data 124 from the distributed computer system 102 via the network 111. The workflow data 124 may include configuration files that define workflows—i.e., sequences of processing steps performed by the computer stages and/or the computer processing pipelines. The scheduling module 122 may be configured to parse the workflow configuration files to identify data sets and historical processing metrics for the computer stages and/or computer processing pipelines to perform computer processing operations on the data sets. In other words, the historical processing metrics may indicate how long it takes for a computer stage to perform a processing operation on an input data set to produce an output data set. The historical processing metrics may be determined based on observation of actual operation of computer stage(s) of computer processing pipeline(s) performing processing operations on the data sets under normal operating conditions with specific computer configurations without the occurrence of errors or anomalies. In other words, the historical processing metrics may be empirically measured based on an operating history as opposed to being theoretically calculated. In some implementations, the historical processing metrics may be periodically updated to account for changes in operation of the computer processing pipeline(s) over time.

The scheduling module 122 may be configured to generate a pipeline graph 126 based on the identified data sets and historical processing metrics. The pipeline graph 126 includes a plurality of nodes. Each identified data set and historical processing metric may be treated as an individual node in the pipeline graph 126. For each workflow, corresponding nodes for the input and output data sets may be added into the pipeline graph 126. Then edges may be added between nodes to form paths that connect the input data sets to the output data sets. Each node may be marked by an absolute path of the corresponding dataset to avoid duplicate nodes in the pipeline graph 126.

The scheduling module 120 may be configured to generate the historical expected schedule 122 based on the pipeline graph 126. In particular, the scheduling module 120 may be configured to, for each path through the pipeline graph 126, sequence observed runtimes for different computer processes performed by the computer stages along the path to determine the expected ready time or availability of output data sets. Each expected ready time may be calculated by applying the historical processing metric for the processing operation to process the data set. The scheduling module 120 may be configured to step through each node of the pipeline graph 126 to populate the historical expected schedule 122 with expected ready times. The expected ready times of the historical expected schedule 122 may be the expected ready times that would occur under compliant operation of the computer stages and/or computer processing pipelines when no errors or computer anomalies occur. The generation process may be performed to populate the historical expected schedule 122 such that the historical expected schedule may be applied to any suitable start time. As a simplified example, a two-stage processing pipeline may include a first stage having a one-hour runtime and a second stage having a two-hour runtime. If the processing pipeline starts at 1:00 hours, then the first stage may be scheduled to produce an output data set at 2:00 hours and the second stage may be scheduled to produce an output data set at 4:00 hours. If the processing pipeline starts at 4:00 hours, then the first stage may be scheduled to produce an output data set at 5:00 hours and the second stage may be scheduled to produce an output data set at 7:00 hours.

In some examples, the runtimes that are determined based on the historical processing metrics may be static, such that a processing runtime may be the same regardless of the time at which the processing operation is performed (e.g., based on when the pipeline is started). In some examples, the runtimes that are determined based on the historical processing metrics may be time dependent, such that the runtime may be different based on the time at which the processing operation is performed. In some such examples, the time-dependent runtimes may be determined based on historical observed behavior of the computer processing pipelines.

FIG. 2 schematically shows aspects of the historical expected schedule 122 that may be generated by the scheduling module 120 shown in FIG. 1. The depicted example includes a time window of twenty-eight hours spanning July 1 to July 2 of the historical expected schedule 122. In this example window of time, a plurality of hourly computer processes 200 is scheduled to be performed by one or more computer stages of one or more computer processing pipelines. In particular, at 1:00 hours on July 1, process A is scheduled to be performed on input data set A to produce output data set B. Process A has an expected runtime of 0.9 hours that is determined based on a historical processing metric for the process A to be performed on data set A. The historical processing metric may be empirically determined from observation of previous/historical operation of the computer stage(s) of the computer processing pipeline(s). Based on the start time and the historical processing metric for process A, the expected time for the output data set B to be available is at 1:54 hours on July 1. Process B is scheduled to be performed at 2:00 hours on July 1 on input data set B to produce output data set C. Process B may be offset from the expected ready time of process A by a buffer duration to allow for a tolerance in runtime for the processing operation. Process B has an expected runtime of 0.9 hours that is determined based on a historical processing metric for the process B to be performed on data set B. Based on the start time and the historical processing metric for process B, the expected time for the output data set C to be available is at 2:54 hours on July 1. Process C is scheduled to be performed at 3:00 hours on July 1 on input data set C to produce output data set D. Process C may be offset from the expected ready time of process B by a buffer duration to allow for a tolerance in runtime for the processing operation. Process C has an expected runtime of 0.9 hours that is determined based on a historical processing metric for the process C to be performed on data set C. Based on the simulated start time and the historical processing metric for process C, the expected time for the output data set D to be available is at 3:54 hours on July 1. These hourly processes 200 are scheduled to be performed every hour on the hour through the depicted window of time. However, each hourly process 200 is dependent on the output data set of the previous hourly process being available. Therefore, any above-threshold deviation from the historical expected schedule could cause an anomaly that could have downstream repercussions on other processes/stages.

Furthermore, in the depicted window of time of the historical expected schedule 122, a plurality of daily computer processes 202 is scheduled to be performed by one or more computer stages of one or more computer processing pipelines. In particular, at 3:00 hours on July 1, process D is scheduled to be performed on input data set E to produce output data set F. Process D has an expected runtime of 23 hours that is determined based on a historical processing metric for the process D to be performed on data set E. Based on the simulated start time and the historical processing metric for process D, the expected time for the output data set F to be available is at 2:00 hours on July 2. Process G is scheduled to be performed at 3:00 hours on July 2 on input data set G to produce output data set F. Process G may be offset from the expected ready time of process D by a buffer duration to allow for a tolerance in runtime for the processing operation. Process G has an expected runtime of 23 hours that is determined based on a historical processing metric for the process G to be performed on data set F. Based on the simulated start time and the historical processing metric for process G, the expected time for the output data set C to be available is at 2:00 hours on July 3. In this example, process G is dependent on the data set G being available. Therefore, any above-threshold deviation to process D could cause an anomaly that could prevent successful execution of process G.

The depicted processes are provided as non-limiting examples. It will be appreciated that the historical expected schedule 122 may include any suitable number of processing operations scheduled for any suitable start time. The historical expected schedule 122 may include any suitable information relating to the processing operations and the expected timing and results of performing the processing operations. Further, the historical expected schedule 122 may span any suitable duration/temporal range.

In the depicted example, each of the intermediate processes have predetermined start times (with built in buffer time). In other examples, the start time of each intermediate process can also be non-predetermined. For example, if a process C uses both data set A and data set B as inputs, then process C may be started only after both A and B are available. When generating the expected schedule in this manner, the start time of a process may be determined by the latest available time of all the input data sets for the process.

In the depicted example, the historical expected schedule is populated with processing operations, scheduled start times, data sets, and historical expected runtimes that are parsed from the workflow data 124 shown in FIG. 1. Further, the scheduling module 120 is configured to, for each processing operation, calculate the expected time stamp that the output data set will be available from the processing operation based on a historical runtime for the processing operation and add the expected time stamp to the historical expected schedule 122. The historical expected schedule 122 provides a foundation for the automatic computer monitoring and anomaly detection for the computer processing pipeline(s).

In some implementations, the historical expected schedule 122 may include scheduled start times that have tolerances that allow for the scheduled start time to be shifted without triggering an error or anomaly. In some examples, each processing operation may have the same tolerance (e.g., five minutes). In some examples, different types of processing operations may have different tolerances. For example, an hourly processing operation may have a tolerance of five minutes, and a daily processing operation may have a tolerance of thirty minutes. In some examples, the tolerance may be set as a percentage of the expected processing runtime (e.g., 5% of the runtime). As one such example, a processing operation having an expected runtime of sixty minutes may have a tolerance of three minutes. It will be appreciated that any processing operation may have any suitable tolerance built into the historical expected schedule.

Returning to FIG. 1, the automatic monitoring computer system 118 may comprise an anomaly detection module 128. The anomaly detection module 128 may be configured to automatically monitor operation of the plurality of computer processing pipelines 100 to detect errors or computer anomalies of the plurality of computer processing pipelines 100. In particular, the anomaly detection module 128 may be configured to automatically sample output data sets 130 from the storage machines 106 of the distributed computing system 100 at designated times dictated by the historical expected schedule 120. For example, a designated time may be a time at or within a threshold duration after the output data set is expected to be available as dictated by the historical expected schedule 122.

In some examples, the anomaly detection module 128 may sample an output data set of each computer stage of a computer processing pipeline being monitored. In some examples, the anomaly detection module 128 may sample output data sets of selected computer stages of a computer processing pipeline being monitored.

The anomaly detection module 128 may be configured to automatically test the sampled output data set for compliance with one or more detection rules 132. Non-compliance of the output data set may indicate an error or computer anomaly. The anomaly detection module 128 may be configured to apply any suitable type of detection rule to a sampled output data set. As one example, a detection rule may specify that an anomaly is generated based on the output data set being unavailable for sampling at the designated time. In other words, the data set cannot be received from the storage machines 106 at the designated time. As another example, a detection rule may specify that an anomaly is generated based on the output data set being unavailable to be provided as input to downstream computer stage of the computer processing pipeline. This type of rule may allow for downstream dependency errors or anomalies to be anticipated and identified. In this way, the errors/anomalies can be potentially resolved in time for the dependent processing operation to be performed without compounding problems. As yet another example, a detection rule may specify that an anomaly is generated based on a value in the output data set being outside of an expected value range. As yet another example, a detection rule may specify that an anomaly is generated based on the output data set being stale (i.e., generated from a previous run of the pipeline). As yet another example, a detection rule may specify that an anomaly is generated based on a format of the output data set being different than an expected format. It will be appreciated that numerous other types of detection rules may be used for testing by the anomaly detection module 128.

In some implementations, the automatic monitoring computer system 118 optionally may include an anomaly evaluation module 136. The anomaly evaluation module 136 may be configured to assign a priority level to each identified error or anomaly based on one or more priority rules 138. The priority level may be selected from a plurality of different priority levels (e.g., high, medium, low priority levels). In some examples, the priority level may indicate or prioritize which errors may be more significant and/or need to be addressed ahead of other errors or anomalies. The priority rules 138 may prioritize anomalies in any suitable manner based on one or more factors. In some examples, the priority rules 138 may be based on time. For example, the priority rules may specify that a priority level of anomaly may increase as a time that the anomaly is left unresolved increases. In some examples, the priority rules may specify that a priority level is determined based on a type of processing operation that triggered the anomaly.

Once the errors or anomalies are identified (and optionally prioritized), the anomaly detection module 128 may be configured to automatically issue an anomaly alert 134. In other words, the anomaly alert 134 may be issued based on an output data set being non-compliant with the detection rules 132. The anomaly alert 134 may indicate one or more errors or anomalies identified as a result of testing the sampled output data sets 130.

The anomaly detection module 128 may issue the anomaly alert 134 in various forms. In some examples, issuing the anomaly alert 134 may include logging the anomalies in anomaly records 142 stored in an anomaly alert storage machine 140 (e.g., database) of the automatic monitoring computer system 118. The anomaly records 142 may include a history of all previous and outstanding anomalies detected by the anomaly detection module 128. In some examples, each anomaly logged in the anomaly records 142 may be indicated as active/outstanding or resolved. The anomaly records 142 may be updated each time the anomaly detection module 128 issues an anomaly alert 134.

In another example, issuing an anomaly alert may include sending, to an administrator computer system 146, via the computer network 111, an alert message 148 that identifies one or more anomalies. The administrator computer system 146 may be associated with a human administrator that is charged with monitoring operation of the plurality of computer pipelines 100. The administrator computer system 146 may take any suitable form, such as a desktop computer, a laptop computer, or a mobile computer (e.g., tablet or smartphone). In one example, the alert message 148 may take the form of an email. In another example, the alert message 148 may take the form of a short message service (SMS) text message. The alert message 148 may take any suitable form and may include any suitable information relating to identified computer anomalies, such as computer stages and/or computer processing pipelines at which the computer anomalies occurred, timing of the anomalies, dependencies, etc.

In another example, issuing the anomaly alert may include presenting, via a display, a graphical user interface including information relating to the identified computer anomalies. For example, the graphical user interface may take the form of an anomaly alert dashboard 150. The anomaly alert dashboard 150 may include visual representations of the identified computer anomalies.

Figure 3A:
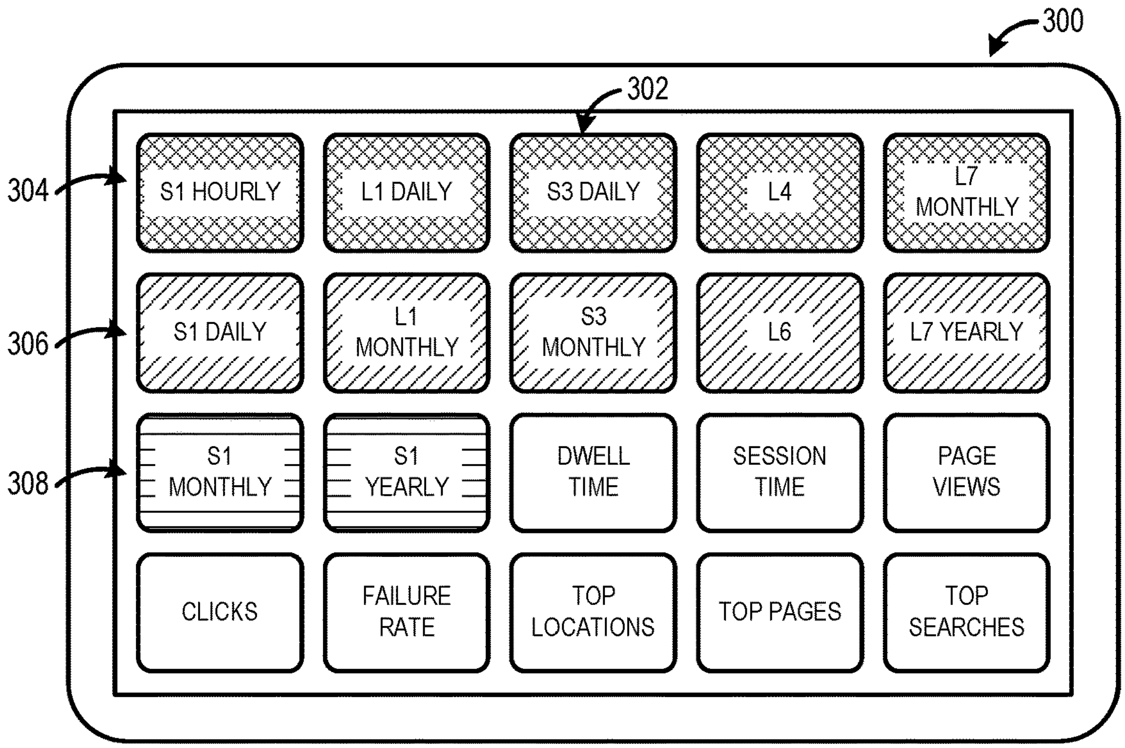
FIGS. 3A and 3B schematically show an example anomaly alert dashboard graphical user interface.
Figure 3B:
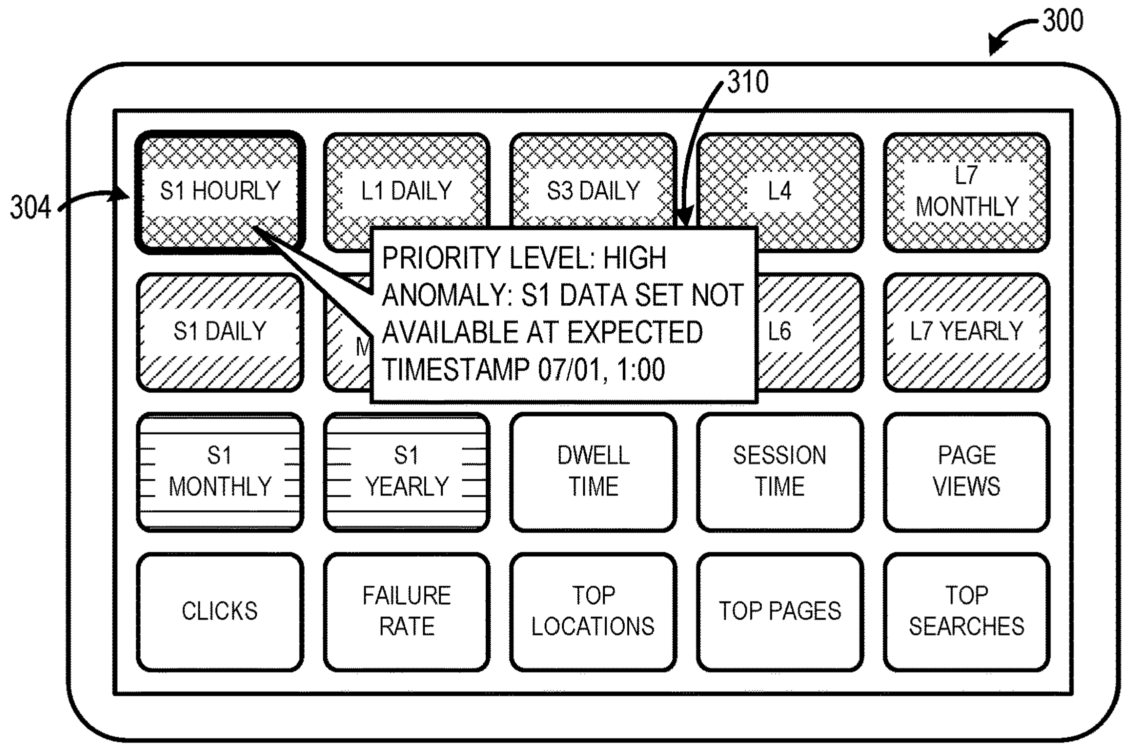

FIGS. 3A and 3B schematically show an example anomaly alert dashboard graphical user interface 300. As shown in FIG. 3A, the anomaly alert dashboard includes a plurality of anomaly elements 302, each anomaly element may correspond to a different active/outstanding anomaly identified by the automatic monitoring computer system 118. In this example, different anomaly elements have different visual characteristics that indicate different priority levels. In particular, anomaly elements associated with anomalies having a high priority level are cross-hatched; anomaly elements associated with anomalies having a medium priority level are diagonally-hatched; anomaly elements associated with anomalies having a low priority level are horizontally-hatched; and anomaly elements associated with anomalies that are resolved and/or 'healthy' are solid white.

Furthermore, in the depicted example, anomalies having dependencies may be linked through the priority levels. For example, the anomaly element 304 may be associated with an anomaly identified for a processing operation that is performed to produce the S1 data set on an hourly basis. As one non-limiting example, the S1 data set may be a total number of unique users that visits a web site, in this case during a particular hour. The processing operation performed on an hourly basis to produce the S1 data may be provided as input for other processing operations. For example, a processing operation to produce the S1 data set on a daily basis may receive as input the S1 hourly data sets for twenty-four hours of a day. In other words, the S1 daily processing operation may be dependent on the S1 hourly processing operation. Further still, the S1 daily processing operation may be provided as input to an S1 monthly processing operation. As such, when the anomaly for the S1 hourly processing operation is identified, additional anomalies may be identified for the S1 daily processing operation, and the S1 monthly processing operation that depend on the S1 hourly processing operation. The anomaly alert dashboard 300 may include anomaly elements associated with each of these anomalies. In particular, anomaly element 304 corresponds to the S1 hourly processing operation, anomaly element 306 corresponds to the S1 daily processing operation, and anomaly element 305 corresponds to the S1 monthly processing operation. In this example, anomaly element 304 is assigned the high priority level, because the anomaly/processing operation has actually occurred. The anomaly element 306 is assigned the medium priority level, because the anomaly/processing operation has not yet occurred but is imminent. The anomaly element 308 is assigned the low priority level, because the anomaly element/processing operation has not yet occurred and is not imminent. Note that these examples are meant to be non-limiting, and the anomaly alter dashboard 300 may take any suitable form to convey information related to errors or computer anomalies in operation of the plurality of computer processing pipelines 100 shown in FIG. 1.

In some implementations, the anomaly alert dashboard 300 may be interactive. For example, each of the plurality of anomaly elements 310 may be selectable to present additional in-depth information about the particular anomaly associated with the anomaly element. In one example shown in FIG. 3B, anomaly element 304 is selected. An in-depth information overlay 310 is presented based on selection of the anomaly element 304. The overlay 310 includes information relating to the anomaly identified for the S1 hourly process operation. For example, the overlay 310 may include a priority level of the anomaly (e.g., a high priority level) and an anomaly type (e.g., S1 data set not available at expected timestamp). An overlay may include any suitable information relating to an associated anomaly.

Returning to FIG. 1, in some implementations, the anomaly detection module 128 may be configured to issue different types of anomaly alerts based on different types of identified anomalies. For example, a first type of anomaly may trigger an anomaly element to be displayed in the anomaly alert dashboard 300 shown in FIGS. 3A and 3B. Further, a second type of anomaly may trigger a message (e.g., an email) to be sent to the administrator computer system 146.

In some implementations, the anomaly detection module 128 may be configured to issue different anomaly alerts based on a priority level of an anomaly. In some examples, the anomaly alerts may be issued according to an escalation hierarchy. For example, when an anomaly has a low priority level, an anomaly element may be presented in the anomaly alert dashboard 300 shown in FIGS. 3A and 3B. Further, when the anomaly has a medium priority level, a message may be sent to the administrator computer system 146 and the anomaly may be presented in the anomaly alert dashboard 300. Further still, when the anomaly has a high priority level, a phone message may be sent to an administrator phone, a message may be sent to the administrator computer system 146, and the anomaly may be presented in the anomaly alert dashboard 300. In another example, anomaly alerts may be issued to more and/or different administrators (e.g., supervisors) based on escalation of anomaly.

In some implementations, the anomaly detection module 128 may be configured to sample the output data sets, test the output data sets, and issue an anomaly alert based on such testing at repeated intervals (e.g., every minute, hour, day, month, year). Any suitable condition may trigger these operations to be repeated. In some examples, such intervals may be selected based on the historical expected schedule 122.

In some implementations, the automatic monitoring computer system 118 may be configured to resolve previously-identified anomalies at each interval repeat. The anomaly detection module 128 may be configured to, at each interval repeat, for each of one or more previously-identified anomalies, automatically computer re-test a re-sampled output data set that triggered the previously-identified anomaly for compliance with the one or more detection rules. If the re-sampled data set complies with the detection rules 132, then the anomaly detection module 128 may resolve the previously-identified anomaly. If the re-sampled data set does not comply with the detection rules 132, then the anomaly detection module 128 may continue to include the previously-identified anomaly in the anomaly alert 134 issued at the current interval. Additionally, in some implementations, the anomaly evaluation module 136 may be configured to change a priority level of a previously-identified anomaly from one interval repeat to the next. For example, as an anomaly remains unresolved from interval repeat to interval repeat, the priority level of the anomaly may be increased so that it can be prioritized over other anomalies having lower priority levels.

Figure 4:
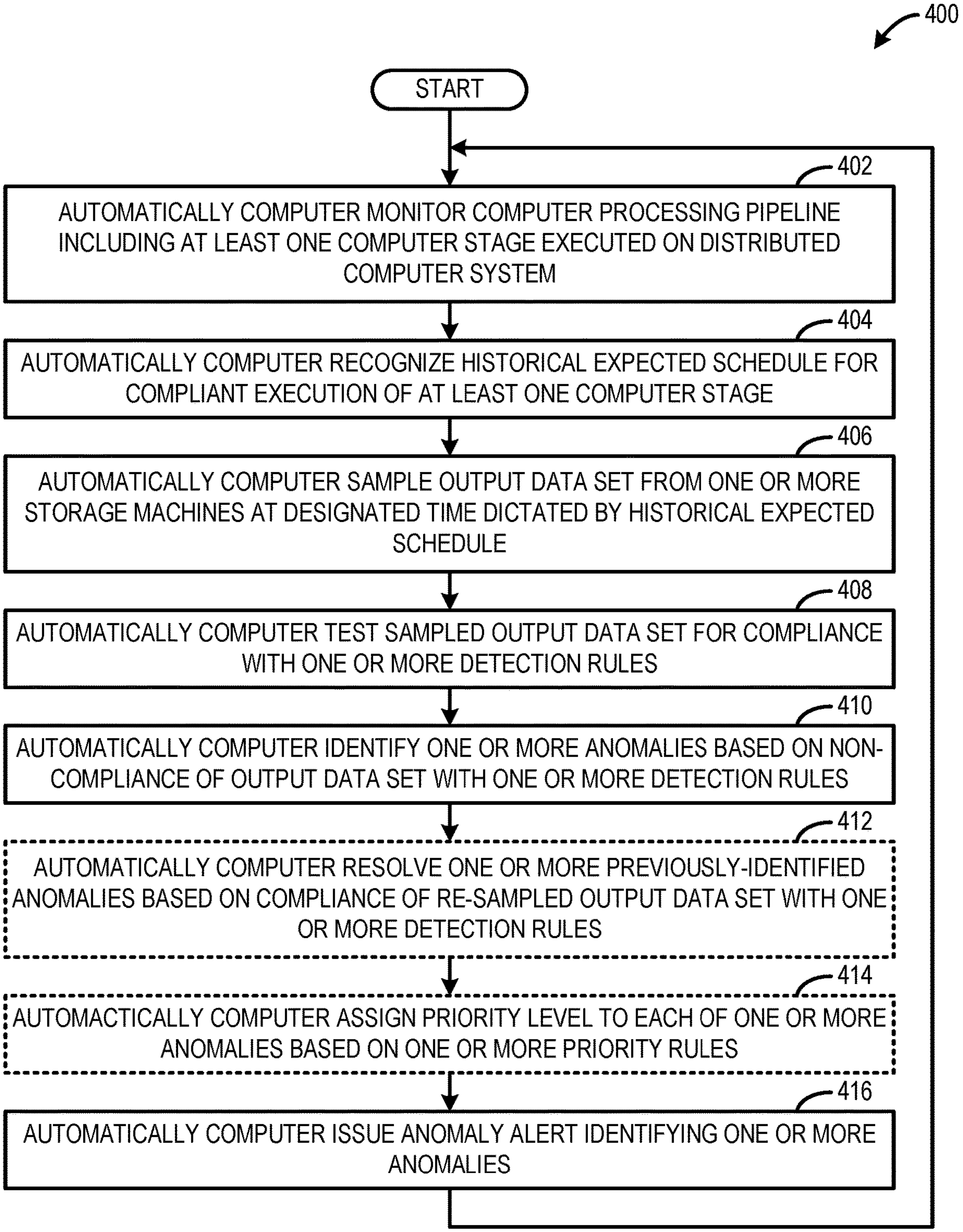
FIG. 4 is a flowchart of a method for automatically detecting computer anomalies.

FIG. 4 is a flowchart of a method 400 for automatically detecting computer anomalies. The method 400 may be performed on at least one computer stage of a computer processing pipeline. In some examples, the method 400 may be performed on each computer stage of a computer processing pipeline. Further, in some examples, the method 400 may be performed on each computer stage of a plurality of different processing pipelines. In some such examples, the method 400 may be performed on multiple different computer processing pipelines in parallel. In one example, the method 400 may be performed by the automatic monitoring computer system 118 shown in FIG. 1.

At 402, the method 400 includes automatically computer monitoring a computer processing pipeline executed on a distributed computer system. The computer processing pipeline may include a plurality of ordered computer stages. At least one computer stage of the plurality of ordered computer stages may be configured to receive an input data set from one or more storage machines of the distributed computer system and perform one or more computer processing operations on the input data set to produce an output data set. The output data set may be stored on the one or more storage machines and provided as input to a different computer stage of the computer processing pipeline.

At 404, the method 400 includes automatically computer generating a historical expected schedule for compliant execution of the at least one computer stage. In some examples, the historical expected schedule may be generated based on a pipeline graph of data sets and associated processing metrics parsed from processing workflow configuration files for the computer processing pipeline.

At 406, the method 400 includes automatically computer sampling the output data set from the one or more storage machines at a designated time dictated by the historical expected schedule.

At 408, the method 400 includes automatically computer testing the sampled output data set for compliance with one or more detection rules.

At 410, the method 400 includes automatically computer identifying one or more anomalies based on non-compliance of the output data set with the one or more detection rules.

In some implementations, at 412, the method 400 optionally may include automatically computer resolving one or more previously-identified anomalies based on compliance of a re-sampled output data set with the one or more detection rules. The one or more previously-identified anomalies may be identified from a previous iteration of the method 400 being performed to automatically computer monitor the computer processing pipeline.

In some implementations, at 414, the method 400 optionally may include automatically computer assigning a priority level to each of the one or more anomalies based on one or more priority rules.

At 416, the method 400 includes automatically computer issuing an anomaly alert identifying one or more anomalies based on non-compliance of the output data set with the one or more detection rules. In one example, issuing the anomaly alert includes logging the one or more anomalies in anomaly alert records (e.g., a database). In another example, issuing the anomaly alert includes presenting, via a display, a graphical user interface including visual representations of the one or more anomalies. In yet another example, issuing the anomaly alert includes sending an alert message identifying the one or more anomalies. In some such examples, sending an alert message may include sending an email message to an administrator computer. In some such examples, sending an alert message may include sending a text message to an administrator cellular phone.

The method 400 may be performed for one or more computer stages of the computer processing pipeline. In some examples, the method 400 may be performed for each computer stage of the computer processing pipeline. Moreover, in some examples, the method may be performed for a plurality of computer processing pipelines to automatically detect computer anomalies in operation of the plurality of computer processing pipelines. Furthermore, the method 400 may be repeatedly performed according to a regular interval. In some examples, the interval may be determined based on the historical expected schedule.

In some implementations, the methods and processes described herein may be tied to a computing system of one or more computing devices. In particular, such methods and processes may be implemented as a computer-application program or service, an application-programming interface (API), a library, and/or other computer-program product.

Figure 5:
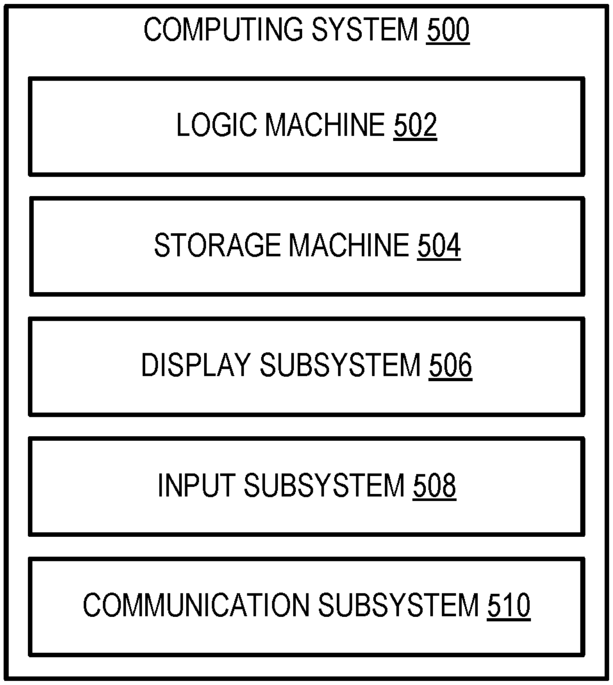
FIG. 5 schematically shows an example computing system.

FIG. 5 schematically shows a non-limiting implementation of a computing system 500 that can enact one or more of the methods and processes described above. Computing system 500 is shown in simplified form. Computing system 500 may take the form of one or more personal computers, server computers, tablet computers, home-entertainment computers, network computer, gaming devices, mobile computing devices, mobile communication devices (e.g., smart phone), and/or other computing devices. For example, computing system 500 may take the form of one or more computing devices of distributed computer system 1?? and/or automatic monitoring computer system 1?? shown in FIG. 1.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine 520 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 502 may include one or more processors configured to execute software instructions. Additionally or alternatively, the logic machine 502 may include one or more hardware or firmware logic machines configured to execute hardware or firmware instructions. Processors of the logic machine 502 may be single-core or multi-core, and the instructions executed thereon may be configured for sequential, parallel, and/or distributed processing. Individual components of the logic machine 502 optionally may be distributed among two or more separate devices, which may be remotely located and/or configured for coordinated processing. Aspects of the logic machine 502 may be virtualized and executed by remotely accessible, networked computing devices configured in a cloud-computing configuration or distributed computer system.

Storage machine 504 includes one or more physical devices configured to hold instructions executable by the logic machine 502 to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms “module,” “program,” and “engine” may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms “module,” “program,” and “engine” may encompass individual or groups of executable files, data files, libraries, drivers, scripts, database records, etc.

It will be appreciated that a “service”, as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine 504, and thus transform the state of the storage machine 504, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem 508 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem 510 may be configured for communication via a wireless telephone network, or a wired or wireless local- or wide-area network. In some implementations, the communication subsystem 510 may allow computing system 500 to send and/or receive messages to and/or from other devices via a network such as the Internet.

In an example, a method of detecting computer anomalies, comprises automatically computer monitoring a computer processing pipeline executed on a distributed computer system and including a plurality of ordered computer stages, at least one computer stage configured to receive an input data set from one or more storage machines of the distributed computer system and perform one or more computer processing operations on the input data set to produce an output data set, wherein the output data set is stored on the one or more storage machines and provided as input to a different computer stage of the computer processing pipeline, automatically computer generating a historical expected schedule for compliant execution of the at least one computer stage, automatically computer sampling the output data set from the one or more storage machines at a designated time dictated by the historical expected schedule, automatically computer testing the sampled output data set for compliance with one or more detection rules, and automatically computer issuing an anomaly alert identifying one or more anomalies based on non-compliance of the output data set with the one or more detection rules. In this example and/or other examples, the steps of automatically computer recognizing, automatically computer sampling, automatically computer testing, and automatically computer issuing may be performed for each of a plurality of different computer stages of the computer processing pipeline. In this example and/or other examples, the steps of automatically computer recognizing, automatically computer sampling, automatically computer testing, and automatically computer issuing may be repeated at a regular interval for the at least one computer stage. In this example and/or other examples, the method may further comprise at each interval repeat, for each of one or more previously-identified anomalies, automatically computer re-testing a re-sampled output data set that triggered the previously-identified anomaly for compliance with the one or more detection rules and automatically computer resolving the previously-identified anomaly based on the re-sampled data set complying with the one or more detection rules. In this example and/or other examples, the one or more detection rules may specify that an anomaly is generated based on the output data set being unavailable for sampling at the designated time. In this example and/or other examples, the one or more detection rules may specify that an anomaly is generated based on the output data set being unavailable to be provided as input to the different computer stage of the computer processing pipeline. In this example and/or other examples, the one or more detection rules may specify that an anomaly is generated based on a value in the output data set being outside of an expected value range. In this example and/or other examples, the one or more detection rules specify that an anomaly is generated based on a format of the output data set being different than an expected format. In this example and/or other examples, the may further comprise automatically computer assigning a priority level to each of the one or more anomalies based on one or more priority rules. In this example and/or other examples, different anomaly alerts may be issued for different priority levels of the one or more anomalies. In this example and/or other examples, issuing the anomaly alert may include presenting, via a display, a graphical user interface including visual representations of the one or more anomalies. In this example and/or other examples, issuing the anomaly alert may include sending an alert message identifying the one or more anomalies. In this example and/or other examples, sending an alert message may include sending an email to an administer computer system. In this example and/or other examples, sending an alert message may include sending a text message to a telephone. In this example and/or other examples, the historical expected schedule may be generated based on data sets and associated historical processing metrics for performing processing operations on the data sets parsed from processing workflow configuration files for the computer processing pipeline. In this example and/or other examples, the historical processing metrics may be determined based on observation of actual operation of the one or more computer stages performing processing operations.

In an example, a computing system comprises one or more logic machines, and one or more storage machines holding instructions executable by the one or more logic machines to automatically computer monitor a computer processing pipeline executed on a distributed computer system and including a plurality of ordered computer stages, at least one computer stage configured to receive an input data set from one or more storage machines of the distributed computer system and perform one or more computer processing operations on the input data set to produce an output data set, wherein the output data set is stored on the one or more storage machines and provided as input to a different computer stage of the computer processing pipeline, automatically computer generate a historical expected schedule for compliant execution of the at least one computer stage, automatically computer sample the output data set from the one or more storage machines at a designated time dictated by the historical expected schedule, automatically computer test the sampled output data set for compliance with one or more detection rules, and automatically computer issue an anomaly alert identifying one or more anomalies based on non-compliance of the output data set with the one or more detection rules. In this example and/or other examples, the steps of automatically computer recognizing, automatically computer sampling, automatically computer testing, and automatically computer issuing may be repeated at a regular interval for the at least one computer stage. In this example and/or other examples, the one or more storage machines may hold instructions executable by the one or more logic machines to at each interval repeat, for each of one or more previously-identified anomalies, automatically computer re-test a re-sampled output data set that triggered the previously-identified anomaly for compliance with the one or more detection rules, and automatically computer resolve the previously-identified anomaly based on the re-sampled data set complying with the one or more detection rules.

In this example and/or other examples, a method of detecting computer anomalies comprises automatically computer monitoring a computer processing pipeline executed on a distributed computer system and including a plurality of ordered computer stages, at least one computer stage configured to receive an input data set from one or more storage machines of the distributed computer system and perform one or more computer processing operations on the input data set to produce an output data set, wherein the output data set is stored on the one or more storage machines and provided as input to a different computer stage of the computer processing pipeline, automatically computer generate a historical expected schedule for compliant execution of the at least one computer stage, automatically computer sampling the output data set from the one or more storage machines at a designated time dictated by the historical expected schedule, automatically computer testing the sampled output data set for compliance with one or more detection rules, and automatically computer identifying one or more anomalies based on non-compliance of the sampled output data with the one or more detection rules, automatically computer assigning a priority level to each of the one or more anomalies based on one or more priority rules, and automatically computer issuing an anomaly alert identifying the one or more anomalies based on non-compliance of the output data set with the one or more detection rules and based on the associated priority level.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of detecting computer anomalies, comprising:

automatically computer monitoring a computer processing pipeline executed on a distributed computer system and including a plurality of ordered computer stages, at least one computer stage configured to receive an input data set from one or more storage machines of the distributed computer system and perform one or more computer processing operations on the input data set to produce an output data set, wherein the output data set is stored on the one or more storage machines and provided as input to a different computer stage of the computer processing pipeline;

automatically computer generating a historical expected schedule for compliant execution of the at least one computer stage;

automatically computer sampling the output data set from the one or more storage machines at a designated time dictated by the historical expected schedule;

automatically computer testing the sampled output data set for compliance with one or more detection rules; and automatically computer issuing an anomaly alert identifying one or more anomalies based on non-compliance of the output data set with the one or more detection rules, wherein the one or more detection rules specify that an anomaly is generated based on the output data set being unavailable to be provided as input to the different computer stage of the computer processing pipeline.

2. The method of claim 1, wherein the steps of automatically computer recognizing, automatically computer sampling, automatically computer testing, and automatically computer issuing are performed for each of a plurality of different computer stages of the computer processing pipeline.

3. The method of claim 1, wherein the steps of automatically computer recognizing, automatically computer sampling, automatically computer testing, and automatically computer issuing are repeated at a regular interval for the at least one computer stage.

4. The method of claim 3, further comprising:

at each interval repeat, for each of one or more previously-identified anomalies, automatically computer re-testing a re-sampled output data set that triggered the previously-identified anomaly for compliance with the one or more detection rules; and automatically computer resolving the previously-identified anomaly based on the re-sampled data set complying with the one or more detection rules.

5. The method of claim 1, wherein the one or more detection rules specify that an anomaly is generated based on the output data set being unavailable for sampling at the designated time.

6. The method of claim 1, wherein the one or more detection rules specify that an anomaly is generated based on a value in the output data set being outside of an expected value range.

7. The method of claim 1, wherein the one or more detection rules specify that an anomaly is generated based on a format of the output data set being different than an expected format.

8. The method of claim 1, further comprising:

automatically computer assigning a priority level to each of the one or more anomalies based on one or more priority rules.

9. The method of claim 8, wherein different anomaly alerts are issued for different priority levels of the one or more anomalies.

10. The method of claim 1, wherein issuing the anomaly alert includes presenting, via a display, a graphical user interface including visual representations of the one or more anomalies.

11. The method of claim 1, wherein issuing the anomaly alert includes sending an alert message identifying the one or more anomalies.

12. The method of claim 11, wherein sending an alert message includes sending an email to an administer computer system.

13. The method of claim 11, wherein sending an alert message includes sending a text message to a telephone.

14. The method of claim 1, wherein the historical expected schedule is generated based on data sets and associated historical processing metrics for performing processing operations on the data sets parsed from processing workflow configuration files for the computer processing pipeline.

15. The method of claim 14, wherein the historical processing metrics are determined based on observation of actual operation of the one or more computer stages performing processing operations.

16. A computing system, comprising:

one or more logic machines; and one or more storage machines holding instructions executable by the one or more logic machines to:

automatically computer monitor a computer processing pipeline executed on a distributed computer system and including a plurality of ordered computer stages, at least one computer stage configured to receive an input data set from one or more storage machines of the distributed computer system and perform one or more computer processing operations on the input data set to produce an output data set, wherein the output data set is stored on the one or more storage machines and provided as input to a different computer stage of the computer processing pipeline;

automatically computer generate a historical expected schedule for compliant execution of the at least one computer stage;

automatically computer sample the output data set from the one or more storage machines at a designated time dictated by the historical expected schedule;

automatically computer test the sampled output data set for compliance with one or more detection rules; and automatically computer issue an anomaly alert identifying one or more anomalies based on non-compliance of the output data set with the one or more detection rules, wherein the one or more detection rules specify that an anomaly is generated based on the output data set being unavailable to be provided as input to the different computer stage of the computer processing pipeline.

17. The computing system of claim 16, wherein the steps of automatically computer recognizing, automatically computer sampling, automatically computer testing, and automatically computer issuing are repeated at a regular interval for the at least one computer stage.

18. The computing system of claim 17, wherein the one or more storage machines hold instructions executable by the one or more logic machines to:

at each interval repeat, for each of one or more previously-identified anomalies, automatically computer re-test a re-sampled output data set that triggered the previously-identified anomaly for compliance with the one or more detection rules; and automatically computer resolve the previously-identified anomaly based on the re-sampled data set complying with the one or more detection rules.

19. A method of detecting computer anomalies, comprising:

automatically computer monitoring a computer processing pipeline executed on a distributed computer system and including a plurality of ordered computer stages, at least one computer stage configured to receive an input data set from one or more storage machines of the distributed computer system and perform one or more computer processing operations on the input data set to produce an output data set, wherein the output data set is stored on the one or more storage machines and provided as input to a different computer stage of the computer processing pipeline;

automatically computer generate a historical expected schedule for compliant execution of the at least one computer stage;

automatically computer sampling the output data set from the one or more storage machines at a designated time dictated by the historical expected schedule;

automatically computer testing the sampled output data set for compliance with one or more detection rules; and automatically computer identifying one or more anomalies based on non-compliance of the sampled output data with the one or more detection rules;

automatically computer assigning a priority level to each of the one or more anomalies based on one or more priority rules;

automatically computer issuing an anomaly alert identifying the one or more anomalies based on non-compliance of the output data set with the one or more detection rules and based on the associated priority level;

for each of the one or more anomalies, automatically computer re-testing a re-sampled output data set that triggered an automatically computer identified anomaly for compliance with the one or more detection rules; and automatically computer resolving the automatically computer identified anomaly based on the re-sampled data set complying with the one or more detection rules, wherein the one or more anomalies are re-tested and resolved according to an order that is based on priority level such that anomalies having higher priority levels are automatically computer retested and resolved ahead of anomalies having lower priority levels.

* * * * *